Patented July 10, 1945

2,380,299

UNITED STATES PATENT OFFICE 2,380,299

STABILIZED RUBBER COMPOSITIONS

Hector C. Evans, Cranford, and David W. Young, Roselle, N. J., assignors to Standard Oil Development Company, a corporation of Delaware No Drawing. Application March 11, 1942, Serial No. 434,254

11 Claims. (Cl. 260—799)

This invention relates to the production of unvulcanized rubber compositions and products of similar nature enhanced in stability toward the action of light, heat, and oxidation by an additive.

Unvulcanized rubber heated to above 150° F., especially in air, softens as the temperature and time of heating are increased, becomes depolymerized, and changes to a thick brown oil which on cooling is found to have lost typical rubber characteristics. Related rubber-like plastics are subject to this kind of deterioration but to different degrees.

There are a number of commercial uses for rubbery organic material such as natural rubber and related synthetic rubber-like materials in which it is desirable to avoid altering properties of the rubbery organic material by substantial vulcanization. For example, natural rubber is used with solvents in adhesives, with waxes or oils in coating compositions, and with petroleum oils in lubricants. An object of the present invention is to provide for the stabilization of these kinds of compositions.

A specific object of this invention is to provide for the utilization of stabilizing agents which inhibit deterioration of unvulcanized rubber, which avoids separation in homogeneous compositions of rubber with waxes, oils, or other organic blending agents, and which retard discoloration.

Substances found in accordance with the present invention to be exceptionally effective for stabilizing unvulcanized rubber compositions are oil-soluble phenolates of iron, nickel, and cobalt. In the preferred phenolates for this purpose, the metal replaces hydrogen in phenolic hydroxyl groups and the aromatic nuclei are linked together thru a sulfide or a thio-ether linkage. Preferably, the aromatic nuclei in these compounds also contain alkyl side chain substituents, such as isopropyl, isobutyl, or tertiary amyl radicals.

Phenols used as starting materials in preparing the desired stabilizing agents may be made by reacting phenol or its homologues with alkylating agents in accordance with known procedures, and they may be obtained from various natural sources, such as petroleum products or coal tar products. The phenol sulfides are readily obtained by reacting the phenols with sulfur monochloride, sulfur dichloride, or a mixture of the two chlorides.

The phenolates may be prepared by reacting the phenols dissolved in anhydrous ethyl alcohol with metallic sodium to form the sodium phenolates, then reacting the sodium phenolates in alcoholic solution with a salt of the metal it is desired to substitute for the sodium constituent, e. g., nickel chloride (NiCl₂). The reaction of the sodium phenolate with the halide salt of the heavier metal is a double decomposition. The sodium chloride formed in this reaction is separated as a solid from the reaction mixture and the phenolate product is recovered from the solution by evaporation of the alcohol.

A representative structural composition for a nickel phenolate sulfide thus obtained is as follows:

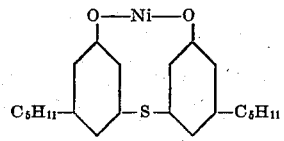

The preferred salts for general utilization, on account of their satisfactory compatibility with unvulcanized rubber, other oil-soluble elastoprenes and their blends, are prepared from the iso-alkyl phenol sulfides, but the salts prepared from analogous phenols having substituents varied in structure, size, number, and position, come within the contemplation of this invention.

Through extensive investigation of phenolates in unvulcanized rubber compositions, it was found that there are certain differences of effectiveness depending on the metal constituent. Very surprisingly, the phenolate salts of the iron family metals in group VIII of the periodic table showed excellent inhibiting powers despite the fact that such metals have been considered to have detrimental catalytic effects on vulcanized rubber compositions.

The phenolates of iron, nickel, and cobalt, or their preferred phenolate sulfides, may be used singly or mixed as stabilizing additives in any of the compounding methods known to the art. They may be added to a softened rubber prior to milling, to a rubber mass on the mill, or may be added to a solution or molten mix containing unvulcanized rubber. Also, they may be mixed with rubber emulsions or rubber latex, or be dissolved in a suitable solvent for addition to the rubber. The amount of these stabilizing additives sufficient for satisfactory results ranges from about 0.01% to about 1% by weight of rubber in the composition but this amount may be varied as desired. It is to be understood that the same method of treatment applies to other synthetic rubber-like materials used in an unvulcanized condition as well as unvulcanized natural rubber.

The term rubbery organic materials used herein is intended to cover natural rubber as well as synthetic rubber-like materials such as isoprene polymers, butadiene polymers, dimethyl butadiene polymers, and mixed polymers of dienes with other compounds, such as styrene, acrylic nitrile, or isobutylene, in so far as these polymers are formed to have a substantial degree of unsaturation and physical characteristics of elasticity, tensile strength, solubility and colloid solution formation resembling those of natural rubber. The rubbery organic materials of particular importance for the present purposes are those which are swelled and dissolved by petroleum hydrocarbons and which may be described as oil-soluble.

Unvulcanized rubber is at times advantageously used in modified forms as, for example, purified of inorganic substances (ash) and nitrogenous substances (proteins), which act to some extent as natural protectors against the action of air and light, and the stabilizing agents herein described are very useful in compositions containing rubber of this character.

Other known types of ingredients for compositions containing unvulcanized rubbery organic materials may be added, for example, fillers, pigments, stiffeners or softeners, dyes, wetting agents, anti-tack agents, etc. Also, if desired, additional stablizing agents may be used.

Example 1

One phase of the invention is demonstrated by test results secured in mixing a de-ashed and de-proteinized natural rubber with a non-volatile petroleum oil, then agitating the mixture at 320° F. by air led into 500 ml. of the mixture at the rate of 2 cu. ft./hr. An identical small proportion of an agent tested for stabilization effectiveness was used in each mixture tested and compared with tests on control samples. Each of the samples was treated in the above described manner for periods of 24 hours and 41 hours to determine the extent of decomposition. The interesting results were that blends containing the ferrous, nickel, and cobalt phenolates showed no precipitation and inhibited decomposition of the rubber as indicated by the constancy of the viscosity-molecular weight values.

Further tests were conducted to determine the effects of the phenolate sulfides on a natural rubber during milling as illustrated in the following example:

Example 2

The nickel salt of tert-amyl phenol sulfide (2.5 grams) was added to 500 grams of yellow crepe rubber on a mill at about 120° F. to 130° F. The composition was milled for a total time of 10 minutes. The milled material was then placed in an oven for 42 hours at a temperature of 190° F., and air was passed thru the oven at a rate of 0.5 cu. ft./hr. The area of the oven was about 1 cu. ft. A control sample of the rubber was treated in a comparative manner without the added stabilizing agent. By comparing the change in the viscosity-molecular weight values, it was found that the nickel phenolate sulfide considerably reduced the breakdown of the rubber subjected to both the milling and intensive oxidation by air at the elevated temperature.

The inhibiting effects of the preferred metal salts of phenol sulfides are elucidated further by tests in which the cobalt salt of tert-amyl phenol sulfide was used as an inhibitor with a rubbery plastic synthesized from butadiene.

Example 3

Molecular weight determinations were made on samples taken from different parts of the rubbery polymer derived from butadiene worked on a rubber mill at 120° F. to 130° F. for 10 minutes. A representative 500 g. sample of this material was tested as a blank by being subjected to the oven treatment described in Example 2 for 21 hours, and another representative sample of this material was subjected to the same treatment in the oven for 21 hours but with 0.1% of the cobalt salt of tert-amyl phenol sulfide incorporated into the material. The changes caused by the oven treatments are shown in the following table:

Table I

| Material | Molecular weights of samples tested | Average molecular weight |
| --- | --- | --- |
| Initial polymer | 42,500<br>43,500<br>45,000 | 43,700 |
| Oven-treated polymer blank | 37,800<br>35,700 | 36,700 |
| Oven-treated polymer+inhibitor | 42,500<br>44,500 | 43,500 |

It is worthy of notice that although the synthetic rubbery polymer tested was inherently more stable than natural rubber, it was demonstrated to be beneficially stabilized by the cobalt phenolate sulfide inhibitor.

Example 4

To test the stabilizing effect of the cobalt phenolate sulfide on natural rubber, the same test as described in Example 2 was applied to crepe rubber. The degree of depolymerization by the oven treatment was determined on the basis of the change in thickening power the rubber gave in C. P. toluene. The toluene solvent has a viscosity of 0.684 centistoke at 20° F. A blank sample and an inhibited sample of the rubber were subjected to the oven treatment described in Example 2 for 21 hours at 190° F. In the inhibited sample 0.1% of cobalt tert-amyl phenolate sulfide was used as the inhibitor. Results of the test are summarized in the following table:

Table II

| Material | Vis. of 0.1 g. in 100 ml. of toluene at 20° C. | Relative viscosity at 20° C. (Vis. of solution)/(Vis. of solvent) |
| --- | --- | --- |
| Original rubber | Cst.<br>1.180 | 1.71 |
| Oven treated rubber uninhibited | 0.897 | 1.31 |
| Oven treated rubber inhibited | 1.103 | 1.61 |

It has been recognized that a relationship exists between the molecular weight and viscosity of rubber in a solvent just as such a relationship exists for synthetic rubbery polymers, but complete quantitative information on the proportionality factor is lacking for natural rubbers at present. The data in Table II indicates definitely good inhibiting of depolymerization by the inhibitor. Furthermore, by visual inspection, it could be seen after the oven treatment that the uninhibited rubber had a tacky and oily surface appearance, whereas the inhibited rubber showed no substantial change in appearance. The depolymerization of the rubber is initiated by the presence of only a trace of oxygen and is a serious matter because rubber which is depolymerized undergoes more rapid ageing and deterioration, thus losing tensile strength, elasticity, and becoming discolored.

Tests were conducted by exposing a white rubber stock compounded from natural rubber to light transmitted thru show window glass. The uninhibited stock in a relatively short time became yellow whereas the stock containing a small amount of the nickel salt of tert-amyl phenolate sulfide showed no change in color for a far greater period. This inhibitor, in particular, was found to be one of the exceptional inhibitors that acts very effectively both in darkness and in light to suppress deterioration of a rubber.

The invention is not intended to be limited by the specific illustrations shown herein, but it is intended to include modifications which come within the scope of the invention as set forth in the appended claims.

We claim:

1. A method of treating an unvulcanized rubber composition which comprises incorporating an oil-soluble phenolate of a metal in the iron family of group VIII of the periodic table with the rubber.

2. A stabilized composition containing a small amount of an oil-soluble phenolate of a metal in the iron, nickel, and cobalt triad, and an unvulcanized rubbery organic material.

3. An unvulcanized rubbery organic material stabilized by an alkyl phenol sulfide in which the hydrogen of the phenolic hydroxy group is replaced by a metal in the iron, nickel, and cobalt triad.

4. A composition as described in claim 3, in which said rubbery organic material comprises polymerized butadiene.

5. A composition as described in claim 3, in which said rubbery organic material comprises polymerized isoprene.

6. A composition containing an unvulcanized rubber and a small amount of the nickel salt of tert-amyl phenol sulfide.

7. A composition containing an unvulcanized rubber and a small amount of the ferrous salt of tert-amyl phenol sulfide.

8. A composition containing an unvulcanized rubber and a small amount of the cobalt salt of tert-amyl phenol sulfide.

9. A stabilized composition comprising an oil-soluble, unvulcanized, rubbery organic material blended with petroleum hydrocarbons and a small amount of a phenol sulfide in which the hydrogen of the phenolic hydroxy group is replaced by a metal in the iron, nickel, and cobalt triad.

10. An unvulcanized white rubber stock stabilized by a small amount of a nickel salt of an alkylated phenol sulfide.

11. A stabilized composition comprising an unvulcanized rubbery organic material dissolved in an organic solvent with a stabilizing amount of an isoalkyl-phenol sulfide in which the hydrogen of the phenolic hydroxy group is replaced by a metal in the iron, nickel, and cobalt triad.

HECTOR C. EVANS.
DAVID W. YOUNG.